Dec. 18, 1928.  
S. W. BATH  
1,695,359  
MOTOR CONTROL MECHANISM FOR MACHINE TOOLS  
Filed Dec. 14, 1925   2 Sheets-Sheet 1
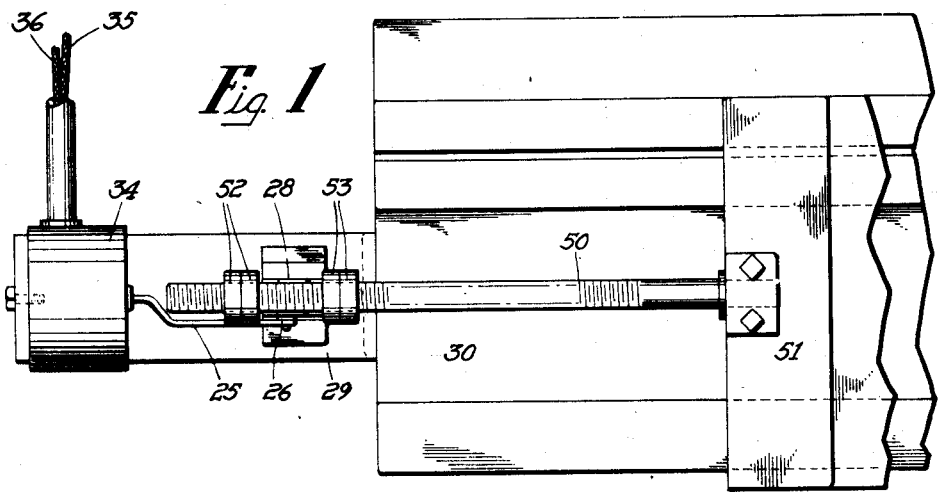
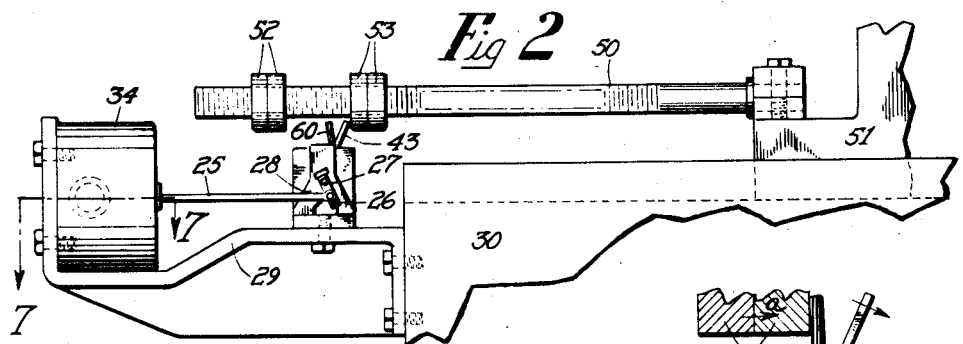
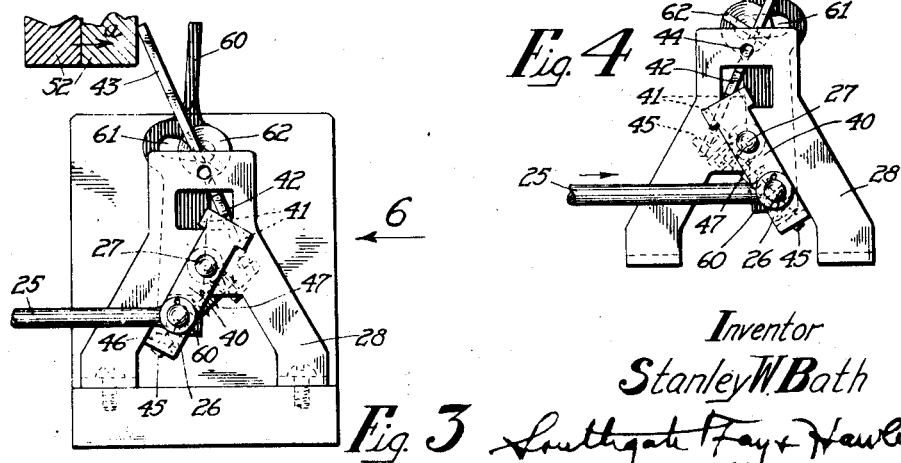
Inventor  
Stanley W. Bath Dec. 18, 1928.  S. W. BATH  1,695,359
MOTOR CONTROL MECHANISM FOR MACHINE TOOLS
Filed Dec. 14, 1925  2 Sheets-Sheet 2
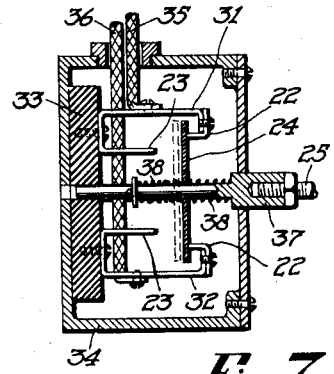
Fig. 7
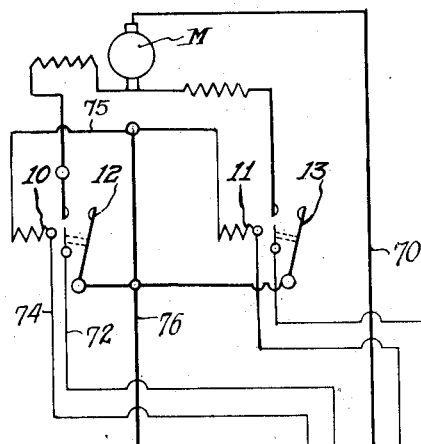
Fig. 8
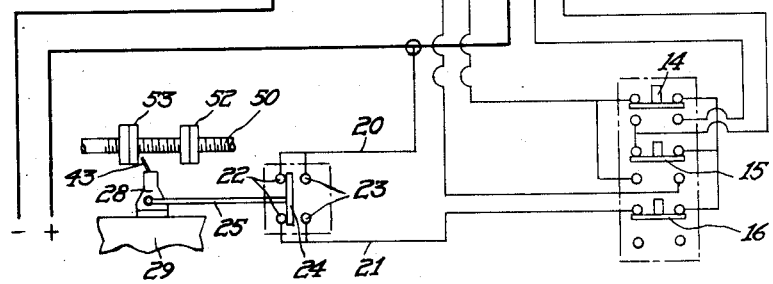
Fig. 6
Fig. 5
Inventor
Stanley W Bath
Southgate Hay & Hawley
Attorneys Patented Dec. 18, 1928.

1,695,359

UNITED STATES PATENT OFFICE.

STANLEY W. BATH, OF WORCESTER, MASSACHUSETTS, ASSIGNOR, BY MESNE ASSIGNMENTS, TO JOHN BATH.

MOTOR-CONTROL MECHANISM FOR MACHINE TOOLS.

Application filed December 14, 1925. Serial No. 75,226.

This invention relates to machine tools such as grinding machines or lathes in which a wheel or tool carriage or other member is moved in opposite directions and in which a reversible electric motor is provided for moving said member.

My invention relates particularly to improved mechanism for controlling the motor in such a machine and it is one object of my invention to provide improved automatic means for breaking a circuit and stopping the motor at each end of the path of travel of the actuated member and for thereafter immediately restoring the circuit to a condition in which the motor may be again started by closing one of the usual switches or push buttons provided for manual control.

Many such machines are so arranged that the motor may be started from rest in either direction and it sometimes happens that the operator may start the machine in the wrong direction, thus continuing the movement of the actuated member beyond the intended limits of travel and beyond the control of the stopping mechanism.

It is therefore a second object of my invention to provide means to stop the machine promptly when the table or other moving member over-runs the desired range of travel.

My invention further relates to arrangements and combinations of parts which will be hereinafter described and more particularly pointed out in the appended claims.

A preferred form of the invention is shown in the drawings in which

Fig. 1 is a plan view of my improved control mechanism;

Fig. 2 is a side elevation thereof;

Fig. 3 is an enlarged side elevation of a portion of the mechanism;

Figs. 4 and 5 are views similar to Fig. 3 but showing the parts in different operative positions;

Fig. 6 is an end elevation looking in the direction of the arrow 6 in Fig. 3;

Fig. 7 is a detail sectional plan view, taken along the line 7—7 in Fig. 2; and

Fig. 8 is a diagrammatic view showing one arrangement of motor connections suitable for use with my improved control mechanism.

Referring particularly to Fig. 8, I have indicated one arrangement of motor connections to which my improved motor is applicable. These connections are of a usual commercial type and include magnets 10 and 11 for closing switches 12 and 13 by which the motor may be started in either desired direction. The magnet 10 and switch 12 are controlled by a push button 15 and the magnet 11 and switch 13 are controlled by a push button 14. If the motor is at rest and the button 14 is depressed, the motor will be started in one direction, while if the button 15 is depressed, the motor will be started in the opposite direction. A third push button 16 is provided by which the motor may be instantly stopped at any time.

For the purposes of my improved control mechanism, I provide two wires 20 and 21 connected into the wiring system above indicated, each of these wires being provided with two contacts, and the contacts being arranged in pairs as indicated at 22 and 23. The pairs of contacts are in parallel and one or the other pair is normally connected by a contact plate 24. The circuit arrangements are such that the plate 24 must engage either the contacts 22 or the contacts 23 as long as the motor operates. When neither pair of contacts is thus engaged, the motor will immediately come to rest and cannot be started so long as both circuits between these two pairs of contacts are open.

The parts are shown in Fig. 8 with the motor at rest. Assume that the button or switch 15 is depressed. The positive lead 70 will then be connected through the wire 20, the contacts 22, the wire 21, the stop button 16, the switch 14, and a branch from the wire 72 to the switch 15, which has been depressed. When depressed, the switch 15 connects the branch from the wire 72 through the switch to the wire 74 connected to the magnet 10 and through the wires 75 to the negative lead 76. The magnet 10 will thus be energized, closing the switch 12 and putting the motor M in circuit between the leads 70 and 76. As the switch 12 closes, it also closes a secondary connection between the magnet 10 and a portion of the wire 72 previously mentioned. The magnet 10 will thus be energized after the button or switch 15 is released and the motor will continue to operate until the contacts 22 are separated when the switch 12 will immediately open, breaking the control circuit.

Depression of the starting button 14 when the motor is at rest will produce a similar result, but will start the motor in the opposite direction. Manual depression of the button 16 has the same effect as the automatic opening of the contacts 22 or 23.

My invention relates particularly to improved means for actuating the contact plate or member 24 to open and close the circuits between the contacts 22 or 23. For this purpose the contact plate 24 is connected by a link 25 (Fig. 2) to an arm or lever 26 which is pivoted at 27 to a stand 28 mounted on a bracket 29 secured to the frame 30 of the machine.

The actual preferred construction shown in Fig. 7 in which it will appear that the contacts 22 and 23 are formed at the opposite ends of conducting members 31 and 32 mounted upon an insulating disc 33 supported by an enclosing casing 34. Wires 35 and 36 are led within the casing 34 and are connected to the members 31 and 32 respectively. The contact plate 24 is yieldingly mounted upon a sliding rod or plunger 37 to which the link 25 is connected. The plate 24 is preferably positioned on the plunger 37 by oppositely disposed springs 38 and is adapted to yield slightly when engaging either of the pairs of contacts 22 or 23. The travel of rod 25 is a little greater than is necessary to close contacts 22 or 23, thus insuring good contact.

The arms 40 of the U-shaped lever 26 extend upward and are provided with inwardly projecting lugs 41 positioned to engage projections 42 (Fig. 6) extending laterally from a lever 43 pivoted at 44 on the stand 28. The projections 42 extend through slots in the stand 28 and also act as stops to limit the throw of the lever 43. A forked plunger 45 is slidable in an opening in the connecting portion 46 of the lever 26 and the forked upper end of the plunger engages the lower end of the lever 43, forming a toggle therewith. A spring 47 pushes upward against the forked end of the plunger 45 and yieldingly acts to break the toggle.

A threaded rod 50 (Fig. 2) is secured to the wheel carriage or other member 51 which is actuated by the motor. Nuts 52 and 53 are adjustable to desired positions on the threaded rod 50 and may be locked in selected position to engage the upper end of the lever 43 as the member 51 is reciprocated.

Assuming that the carriage is moving in the direction of the arrow a indicated in Fig. 3, the nuts 52 will engage the lever 43, moving it slightly beyond its upright or mid position and the spring plunger 45 will thereafter throw the lever 43 to the position indicated in Fig. 4. By such movement, the contact plate 24 will first be separated from the contacts 23 to break the circuit and stop the motor, and will thereafter be moved to the position shown in Figs. 7 and 8, making contact through the contacts 22.

The period of time required for moving the lever 43 to upright position and for thereafter shifting the same by the spring toggle connection is sufficient to permit the magnet 10 or 11 to lose its magnetic force and allow the switch 12 or 13 to open before the connection is again made through the second pair of contacts 22. The machine is thus brought to rest but the circuit is restored to a condition such that pressure on one or the other of the push buttons 14 or 15 will again start the motor in operation.

As above stated, it is usually desirable to prevent further movement of the wheel carriage in the same direction. To accomplish this result, I have provided a stopping lever 60 having a pivot slot 61 through which extends a fixed stud 62. The lower end of the lever 60 is connected to the U-shaped lever 26 at a point which is preferably aligned axially with the pivotal connection of the link 25.

The operation of the additional stopping lever 60 is as follows:—Assuming that the operator has by error depressed the push button which will again start the motor in the direction indicated by the arrow a in Figs. 3, 4 and 5, the nuts 52 having previously engaged and shifted the lever 43, will now engage the lever 60, pushing it along slightly, if necessary, until the lost motion between the lever and its pivot stud 62 is taken up. Most of this lost motion is usually taken up however, during the previous stopping of the machine by the lever 43. Fig. 3 shows the nuts 52 just contacting to stop the motor; Fig. 4 shows the relative positions when this operation is completed; and Fig. 5 shows the finish of the second automatic stopping by the lever 60. The lower end of the lever 60 will then act to push the lever 26 and link 25 in the direction of the arrow b in Fig. 5 and will continue this movement until the contact plate 24 is again out of contact with both contacts 22 or 23, as indicated by dotted lines in Fig. 7. The leverage of the stopping lever 60 is such as to provide increased speed of movement for the link 25, thus opening the control circuit by very slight relative movement of the lever 60.

The motor will thus be brought to rest but there will be no spring toggle action to close the circuit through the second set of contacts. It will be thereafter impossible for the operator to start the machine in either direction until he has manually turned the abutment nuts 52 or 53 sufficiently to withdraw the nuts from engagement with the lever 60.

I have thus provided means for automatically stopping the wheel carriage or other moving member at either limit of its predetermined path of travel and for restoring the circuits for manual control by the operator to again start the motor. If, however, the operator starts the motor in the wrong direction, I have provided means for again stopping the motor after a very slight further movement of the wheel carriage and for maintaining the circuits open until the operator has manually moved the abutment nuts backward to the position from which he displaced them in the wrong direction.

I thus prevent movement of the carriage substantially beyond its predetermined limits of travel, so that it is impossible for the operator to start the carriage in the wrong direction and allow it to run beyond its limits to such an extent as to displace the carriage from its ways or otherwise injure the mechanism.

Having thus described my invention and the advantages thereof, I do not wish to be limited to the details herein disclosed otherwise than as set forth in the claims, but what I claim is:—

1. In a machine tool having a member movable in opposite directions, and having a reversible electric motor to actuate said member, with normal control circuits, therefore, the combination of a motor-controlled mechanism comprising control means effective to break a control circuit of the motor at either end of a predetermined range of travel of said member, and means responsive to said control means to break a circuit of said motor at a second point, said control means thereafter restoring said control circuit at the first break and thereby permitting subsequent manual control of said motor.

2. The combination in a machine tool as set forth in claim 1, in which said control mechanism comprises two pairs of separated contacts in a control circuit of said motor, a device to normally close said circuit through one pair of said contacts, means to open the circuit through said pair of contacts and to restore the circuit through the other pair of contacts after a time interval, and means to open a circuit of said motor at a second point during said time interval.

3. The combination in a machine tool as set forth in claim 1, in which said control mechanism comprises two pairs of separated contacts in a control circuit of said motor, a device to normally close said circuit through a selected pair of said contacts, a toggle lever connected to said circuit closing device, and a spring effective to move said lever suddenly from mid position to either extreme of its path of travel thereby causing said device to open the circuit through the selected contacts and to close the circuit through the second pair of contacts, said toggle lever being engaged and reversed in position by engaging elements moving with said machine tool member and determining the limits of travel thereof.

4. The combination in a machine tool as set forth in claim 1, in which said control mechanism comprises two pairs of separated contacts in a control circuit of said motor, a device to normally close said circuit through a selected pair of said contacts, a toggle lever connected to said circuit closing device, and a spring effective to move said lever suddenly from mid position to either extreme of its path of travel, thereby causing said device to open the circuit through the selected contacts and to close the circuit through the second pair of contacts, said toggle lever being engaged and reversed in position by spaced abutments adjustably mounted on said machine tool member and determining the limits of travel thereof.

5. The combination in a machine tool as set forth in claim 1, in which said control mechanism comprises separated contacts in a control circuit of said motor, a device to normally close the circuit through said contacts, and means to open the circuit through said contacts and to shortly thereafter close said circuit, said means including a device effective to momentarily delay the closing thereof.

6. The combination in a machine tool as set forth in claim 1, in which additional means is provided effective to again break a control circuit of said motor if said machine tool member is actuated to continue its travel in the same direction in which it was moving before the first operation of said control mechanism.

7. The combination in a machine tool as set forth in claim 1, in which an additional lever is positioned in the path of said machine tool member, said lever when moved from mid position in either direction being effective to break a control circuit of said motor.

8. In a machine tool having a member movable in opposite directions and a reversible electric motor to actuate said member, a motor control mechanism comprising a lever movable in either direction by said member to open a control circuit for said motor and to thereafter close said circuit at the point at which it was opened by continued movement in one direction, and a second lever movable in either direction by said member to open said circuit and to thereafter hold said circuit open.

9. In a machine tool having a member movable in opposite directions and a reversible electric motor to actuate said member, a motor control mechanism, a double throw switch, an actuating arm, a link connecting said arm to said switch, a toggle lever mounted for movement by said member to actuate said arm, and reverse said switch, and a stopping lever connected to said switch for actuation by said member upon failure of said toggle lever, movement of said toggle lever and said stopping lever by said member in either direction being effective to move said switch to open position.

10. In a machine tool having a member movable in opposite directions and a reversible electric motor to actuate said member, a motor control mechanism comprising stopping levers, a pair of spaced abutments positioned to engage said levers as said member approaches its limit of travel in either direction, and a double throw switch connected to said levers, and having two circuit closing positions, movement of said stopping levers in either direction from normal position being effective to open the motor circuit at one or the other portion of said switch, and one of said stopping levers being mounted for limited free movement by said member relative to the other of said levers in either direction before becoming effective to open the circuit.

11. In a machine tool having a member movable in opposite directions and a reversible electric motor to actuate said member, a motor control mechanism, a double-throw switch, a fixed stand, an actuating arm pivoted on said stand, a link connecting said arm to said switch, a toggle lever mounted on said stand and movable by said member to swing said arm and reverse said switch, and a stopping lever connected to said switch and having a lost motion pivotal connection to said stand, movement of said stopping lever by said member in either direction being effective to move said switch to open position.

In testimony whereof I have hereunto affixed my signature.

STANLEY W. BATH.